Figure 1:
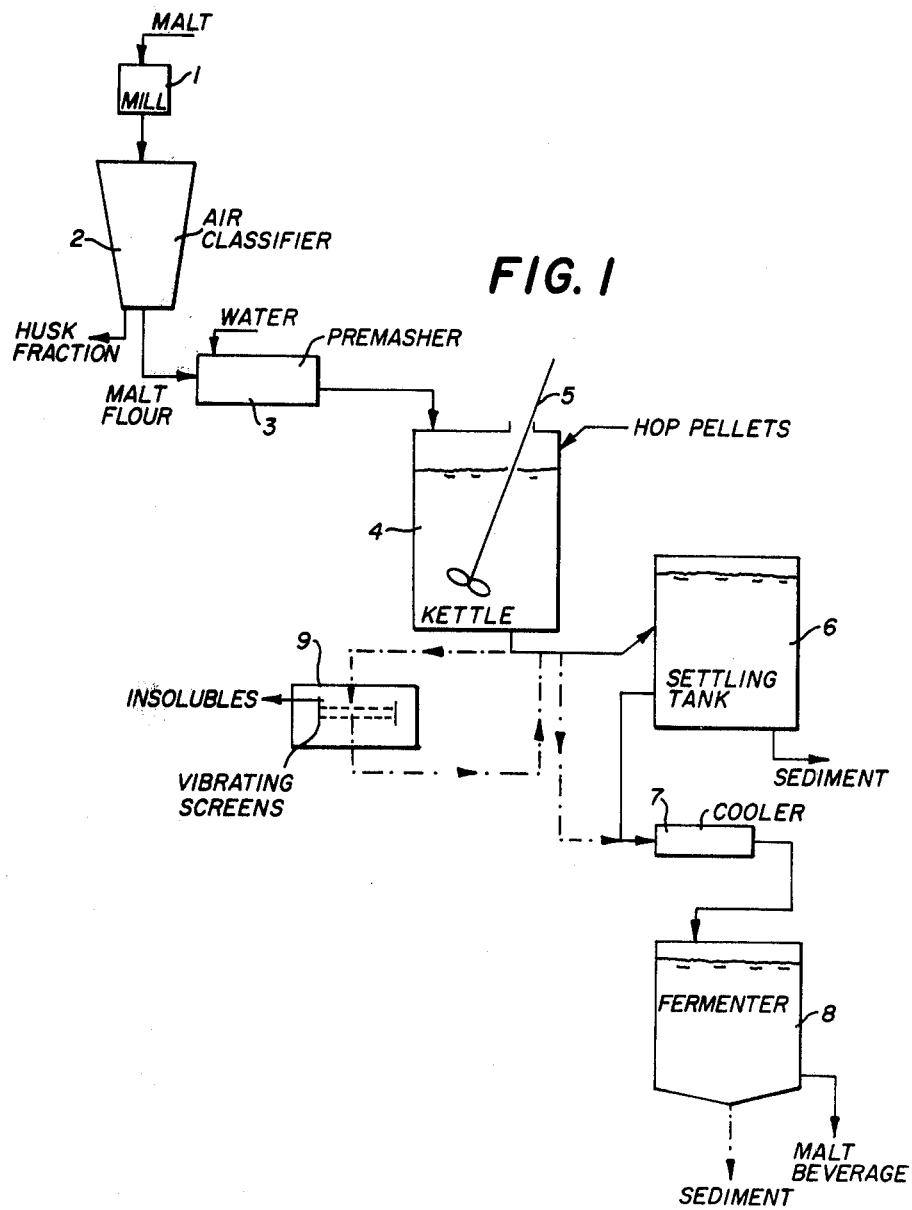

United States Patent [19]

Van Gheluwe et al.

[11] 4,207,345
[45] Jun. 10, 1980

[54] ABBREVIATED BREWING PROCESS

[75] Inventors: Joris E. A. Van Gheluwe, Longueuil; Zoltan Valyi, Westmount; Finn B. Knudsen, Farnham; Miroslav Dadic, Montreal, all of Canada

[73] Assignee: The Molson Companies Limited, Toronto, Canada

[21] Appl. No.: 887,507

[22] Filed: Mar. 17, 1978

[30] Foreign Application Priority Data

Dec. 16, 1977 [CA] Canada ................................. 293257

[51] Int. Cl.² ............................ C12C 5/00; A23L 1/00
[52] U.S. Cl. ........................................ 426/11; 426/29; 426/16; 426/481
[58] Field of Search .................. 426/11, 13, 16, 28, 426/29, 481

[56] References Cited

U.S. PATENT DOCUMENTS 3,711,292  1/1973  Sfat et al. ............................. 426/13

Primary Examiner—Arthur D. Kellogg
Attorney, Agent, or Firm—Anthony J. Casella

[57] ABSTRACT

The conventional brewing process for producing a malt beverage which includes the preparation of a mash, the conversion of the mash to wort, the boiling of the wort, cooling of the wort and fermentation, is substantially abbreviated, e.g. by as much as 50% by subjecting malt flour to air classification to produce a fraction having a high starch content which is used in the mash, whereby the mash conversion and wort boiling steps can be combined in a one-kettle operation to yield a fermentable boiled wort. Moreover, the by-product of the air-classification is a high protein malt flour which can be used to make bread.

9 Claims, 2 Drawing Figures

ABBREVIATED BREWING PROCESS

This invention relates to a process for brewing a malt beverage, and in particular to an abbreviated malt beverage brewing process.

The conventional process for brewing malt beverages, such as beer, includes the basic steps of grinding malt or other cereal grains, mixing the ground grains with water to form a mash and heating the mash to convert the starch in the mash to sugars. The wort thus produced is separated from the spent ground grains by lautering, i.e. filtering, and then boiled with hops and fermented with yeast to yield the malt beverage. Of course, there are usually additional steps and additives used in the brewing process.

It is well known that the normal brewing process is a lengthy operation involving several days, if not weeks. The object of the present invention is to shorten the length of time required to produce a malt beverage in the conventional brewing process, while still providing a product of acceptable quality in terms of flavour, colloidal stability, flavour stability and color.

The invention described herein is based on the discovery that the use of air classification with malt flour yields a malt flour fraction having a high starch content and a low polyphenol (anthocyanogens and catechins) content, which can be utilized to form a mash which can be converted to wort and boiled in a one-kettle operation to yield a beer of superior stability. By carrying out mash to wort conversion and wort boiling in a one-kettle operation without intermediate separation of sediment produced in the conversion, a substantial reduction of the brewing time is realized e.g. as much as 50%.

Figure 2:
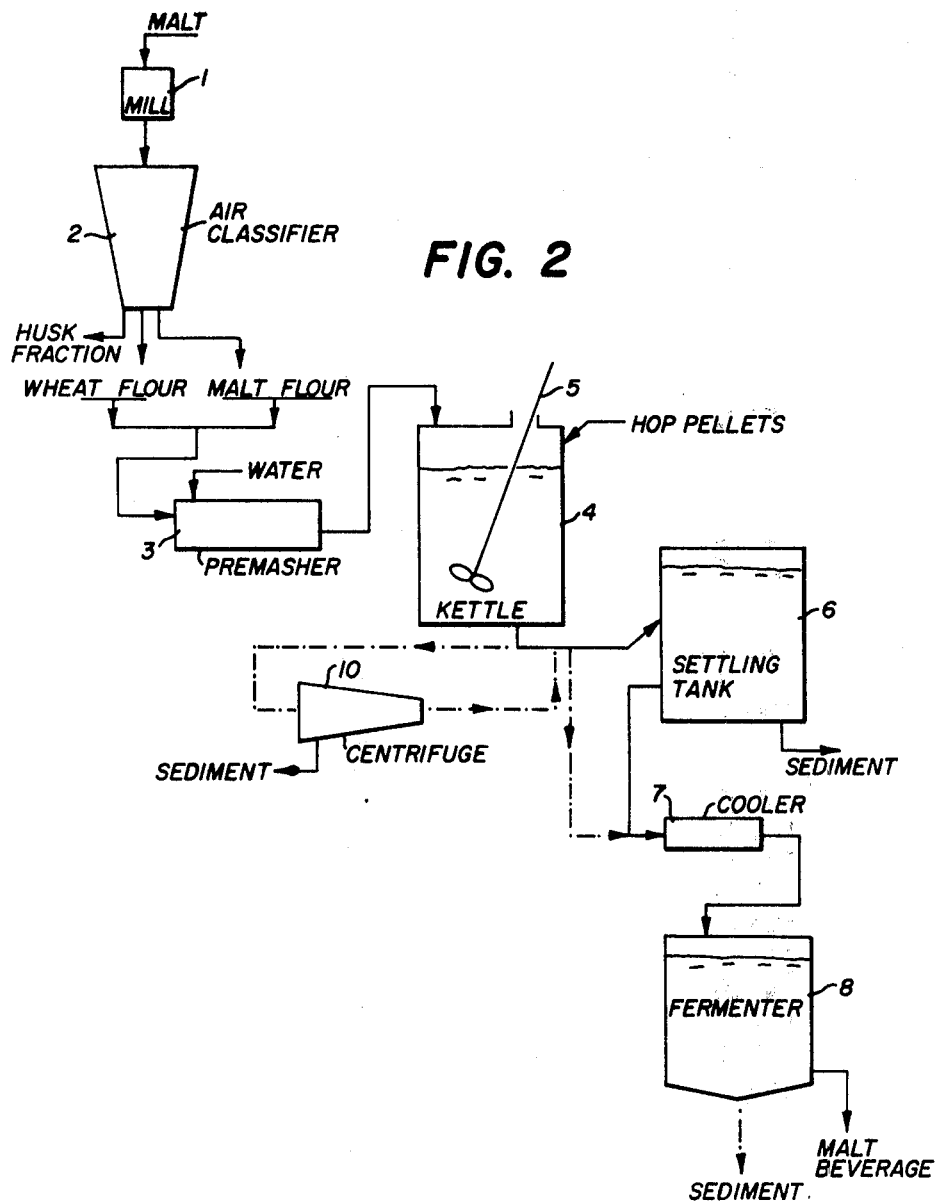

The invention will now be described in greater detail with reference to the accompanying drawings, which illustrate, by way of example, suitable apparatus for carrying out the method of the present invention, and wherein:

FIG. 1 is a schematic flow diagram of an apparatus for performing one embodiment of the method of the present invention; and FIG. 2 is a schematic flow diagram of an apparatus for performing a second embodiment of the method of the present invention.

In the first embodiment of the invention, using the apparatus of FIG. 1, malt is first dehulled by shear and abrasive action using a thresher such as the Hill thresher (not shown). Thrashing yields two fractions, namely dehulled malt (77% of the total weight) and hulls (23% of the total weight). The dehulled malt is placed in an impact mill 1 and subjected to milling to produce a 300 mesh flour. The flour thus produced is classified, i.e. separated into high starch-containing and high protein or low starch-containing fractions in an classifier 2. The air classifier 2 may be an Alpine air classifier (produced by Alpine American Corp. of Natick, Massachusetts, U.S.A.), which consists essentially of a cyclone-type, spiral air stream classification assembly. The classifier 2 separates the malt flour into dense and less dense portions, i.e. starchy and non-starchy components, respectively. The starch fraction (65%) contains only 8.7% protein. The non-starch fraction (12%) contains 22.3% protein and may be sold as a high protein flour for bread making. By proper adjustment, the air classification step can yield a malt starch fraction with over 90% solubles which is important in the process disclosed herein.

The high starch malt flour fraction is premashed with water in a pre-masher 3, and the mash thus produced is fed into a kettle 4 containing a stirrer 5. The mash is heated in the usual manner to yield a wort. In converting the mash to a wort, temperature programming, for example, a 50°–62°–68° C. program can be utilized, or a one temperature conversion can be effected as in an infusion process. Conversion of the mash is completed within 20 minutes at 66° C. The mash is usually kept at such temperature for 45 minutes, and then brought up to boiling.

The usual hop pellets, water correction salts and acid are added, and, by boiling for 30 minutes to 1 hour a fermentable boiled wort is obtained. The boiled wort containing the entire sediment can be subjected to a variety of treatments, including:

(a) Settling in a whirlpool settling tank 6, followed by cooling in a cooler 7, pitching with yeast and fermentation in a fermenter 8. It should be noted that whirlpool settling may create problems, because the volume of sediment is approximately 8 times the volume of the sediment produced under all malt conditions.

(b) Vibrating screens 9 can be used to separate the boiled wort and sediment. The wort is then fed to the cooler 7, and from the cooler to the fermenter 8. Tests done with such screens produced the following separation pattern:

| Screen Size (mesh) | Percentage of Sediment Removed |
| --- | --- |
| 60 | 10 |
| 100 | 70 |
| 120 | 6 |
| 400 | 12 |

By using 100 mesh screens, followed by normal whirlpool settling, it is possible to eliminate all of the hot wort sediment. A drawback to the screening procedure is the resulting high levels of hydroxymethyl furfural in the wort. For this reason and for microbiological reasons, it is advisable to set up the screen in a carbon dioxide atmosphere with a lucite cover over the screen. The carbon dioxide atmosphere protects the wort from microbiological spoilage and prevents excessive oxidation.

(c) The boiled wort and sediment can be discharged directly into the cooler 7 for cooling, pitched with yeast and fermented in the fermenter 8 to produce a beer, which unexpectedly is quite acceptable with good colloidal and flabor stabilities. The shortcoming of this procedure is that fresh yeast must be pitched each time. The sediment is rich in protein and can readily be drum-dried.

Other alternatives include (i) the partial replacement of the malt flour in the kettle 4 with corn syrup to reduce the quantity of sediment, and (ii) the use of a pusher centrifuge (not shown in FIG. 1) between the kettle 4 and the settling tank 6 for separating the boiled wort and sediment.

Typical anayses of malt beverages produced using the process described in the foregoing are given in Table I.

TABLE I

|  | AIR CLASSIFIED MALT-ALE | AIR CLASSIFIED MALT-LAGER | CONTROL ALL MALT-LAGER |
| --- | --- | --- | --- |
| Colour-°L | 1.57 | 1.65 | 3.30 |
| pH | 4.12 | 4.15 | 4.24 |
| Apparent extract % | 2.05 | 2.10 | 2.13 |
| Original extract % | 11.41 | 11.41 | 11.66 |
| Alcohol-weight % | 3.89 | 3.87 | 3.97 |
| Alcohol-volume % | 4.96 | 4.93 | 5.06 |
| Foam Stability | 125 | 110 | 111 |
| Bitterness units | 8.5 | 9.0 | 11.5 |
| Chill Stability | 52 | 68 | 58 |
| Forcing | 80 | 96 | 189 |
| Diacetyl-ppm | — | 0.07 | 0.03 |
| Anthocyanogen value | 51 | 48 | 70 |
| Catechin value | 176 | 163 | 221 |
| Tanninogen value | 227 | 211 | 29 |

Referring now to FIG. 2, an alternative process of brewing a malt beverage utilizes malt flour and a wheat starch or another starch-containing cereal. The alternative process takes advantage of the fact that air classification can be applied to wheat or other starch-containing cereals such as barley, rice, corn and triticale. The wheat fraction is an adjunct used in conjunction with the air classified malt flour. Both mash conversion and boiling are performed as a one-kettle operation (as in the first embodiment of the invention), resulting in a substantial reduction of the brewing time, e.g. by as much as 50%.

Whenever possible, the reference numerals used in FIG. 2 are the same as those in FIG. 1.

In the alternative process, malt is first dehulled using a thresher (not shown) to produce dehulled malt and hulls. The dehulled malt is placed in an impact mill 1 and subjected to milling to produce a 300 mesh flour. The flour thus produced is air classified in a classifier 2, yielding high starch-containing and high protein-containing fractions. At the same time, wheat is subjected to similar treatment to yield a wheat flour with a high starch content.

The malt and wheat flours are premashed with water in a premasher 3, and the mash is fed into a kettle 4 equipped with a stirrer 5. The mash is heated in the usual manner to produce a wort, and, without sediment separation, the wort is boiled to yield a fermentable boiled wort. The boiled wort is subjected to the same treatments as the boiled wort in the first process, namely (a) whirlpool settling in the settler 6, cooling in the cooler 7, pitching with yeast and fermentation in the fermenter 8;

(b) separation of the boiled wort and sediment using vibrating screens 9 (FIG. 1), cooling of the wort in the cooler 7, pitching with yeast and fermentation in the fermenter 8;

(c) discharging of the boiled wort and sediment from the kettle 4 directly to the cooler 7, followed by fermentation;

(d) the partial replacement of the malt and wheat flours in the kettle 4 with corn syrup, and (e) the use of a pusher centrifuge 10 between the kettle 4 and the settling tank 6 for separation of the boiled wort and sediment, cooling and fermentation in the fermenter 8.

The results of analyses of typical samples of beer produced by the second process are given in Table II.

TABLE II

|  | AIR CLASSIFIED MALT & 30% AIR CLASSIFIED WHEAT STARCH - ALE | AIR CLASSIFIED MALT & 30% AIR CLASSIFIED WHEAT STARCH - LAGER | CONTROL ALL-MALT LAGER |
| --- | --- | --- | --- |
| Colour-°L | 1.65 | 1.90 | 3.30 |
| pH | 4.15 | 4.19 | 4.24 |
| Apparent extract % | 2.49 | 2.31 | 2.13 |
| Original extract % | 11.50 | 11.64 | 11.66 |
| Alcohol-weight % | 3.73 | 3.88 | 3.97 |
| Alcohol-volume % | 4.79 | 4.96 | 5.06 |
| Foam stability | 133 | 112 | 111 |
| Bitterness units | 8.5 | 8.0 | 11.5 |
| Chill stability | 46 | 54 | 58 |
| Forcing | 133 | 80 | 189 |
| Diacetyl-ppm | — | 0.06 | 0.03 |
| Anthocyanogen value | 26 | 24 | 74 |
| Catechin value | 140 | 128 | 225 |
| Tanninogen value | 166 | 152 | 299 |

A typical example of the analyses of the drum-dried sediment from the fermenter 8 are given in Table III.

TABLE III

|  | Classified Malt Flour (70%) Classified Wheat Starch (30%) | Classified Malt Flour (70%) Commercial Wheat Flour (30%) |
| --- | --- | --- |
| Moisture | 5.35 | 5.23 |
| Protein %, as is | 39.36 | 38.77 |
| Protein %, dry basis | 41.58 | 40.91 |

From the figures given in Tables I and II, it is readily apparent that the abbreviated brewing process of the present invention, in which the steps of converting the mash to wort and boiling the wort are carried out in a one-kettle operation, has quite substantial advantages, including:

(i) the elimination of the need for grain drying, because all of the hush particles of the grain are eliminated as dry material during air classification;

(ii) the elimination of a lengthy lautering operation to separate sediment from the boiled wort;

(iii) the production of by-products, i.e. malt or other cereal flours with a high protein content which have a high potential market value;

(iv) the production of a product with a relatively high stability;

(v) a reduction of the energy required to carry out the brewing process; and (vi) the facilitating of automation of the brewing process, because fewer components are required in the brewing process.

We claim:

1. A process for brewing a malt beverage comprising the steps of preparing a malt flour; subjecting said malt flour to cyclone-type air classification to yield a malt flour fraction having a high starch content and a low polyphenol content, and a malt flour fraction having a low starch content; mixing said high starch fraction with water to form a mash; heating said mash to form wort; boiling said wort; cooling said wort and fermenting the wort with yeast to yield the malt beverage.

2. A process according to claim 1, wherein the heating of said mash and the boiling of said wort are carried out sequentially without separation of sediment produced in the mash heating step.

3. A process according to claim 1, including the step of subjecting a flour of a starch-containing cereal other than malt to air classification to yield a flour fraction of said cereal having a high starch content and a flour fraction of said cereal having a low starch content; and mixing said flour fraction of the cereal having a high starch content with the malt flour fraction having a high starch content before or during the mash-forming step.

4. A process according to claim 3, wherein said cereal is selected from the group consisting of wheat, barley, rice, corn and triticale.

5. A process according to claim 1, 2 or 3, wherein said malt flour is prepared by dehulling malt and subjecting the dehulled malt to milling.

6. A process according to claim 2, or 3, wherein the boiled wort is subjected to whirlpool settling prior to cooling to separate sediment from the wort.

7. A process according to claim 1, 2 or 3, wherein sediment in the boiled wort is separated prior to cooling with vibrating screens or a pusher centrifuge.

8. A process according to claim 1, 2 or 3, wherein corn syrup is added to said mash to reduce the quantity of sediment formed during conversion of the mash to wort.

9. A process according to claim 1, 2 or 3, wherein said malt flour having a high starch content is at least 90% soluble.

* * * * *